(12) United States Patent
Zhang et al.

(10) Patent No.: US 10,256,638 B2
(45) Date of Patent: Apr. 9, 2019

(54) METHOD AND SYSTEM FOR OPERATING A SET OF GENERATORS

(71) Applicant: GE Aviation Systems LLC, Grand Rapids, MI (US)

(72) Inventors: Jinhui Zhang, Dayton, OH (US); Paul Robert Gemin, Cincinnati, OH (US); Arthur Vorwerk Radun, Mason, OH (US); David Andrew Woodburn, Dayton, OH (US); Matthew Bruce Lemon, Dayton, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 36 days.

(21) Appl. No.: 15/685,072

(22) Filed: Aug. 24, 2017

(65) Prior Publication Data

US 2019/0067950 A1 Feb. 28, 2019

(51) Int. Cl.
*H02J 3/40* (2006.01)
*H02K 7/18* (2006.01)
*F02C 3/04* (2006.01)

(52) U.S. Cl.
CPC .............. *H02J 3/40* (2013.01); *H02K 7/1823* (2013.01); *F02C 3/04* (2013.01); *F05D 2220/76* (2013.01)

(58) Field of Classification Search
CPC ...... H02J 3/40; H02K 7/1823; F05D 2220/76; F02C 3/04
See application file for complete search history.

(56) References Cited

U.S. PATENT DOCUMENTS

| | | | |
|---|---|---|---|
| 2,972,058 A * | 2/1961 | Kahle | H02J 3/46 307/57 |
| 6,320,511 B1 | 11/2001 | Cronin et al. | |
| 7,175,136 B2 | 2/2007 | Shah et al. | |
| 7,230,205 B2 | 6/2007 | Twerdochlib | |
| 7,423,411 B2 | 9/2008 | Sihler | |
| 7,628,359 B2 | 12/2009 | Shah et al. | |
| 7,936,086 B2 | 5/2011 | Yue et al. | |
| 7,965,201 B2 | 6/2011 | Shah et al. | |
| 8,602,359 B2 | 12/2013 | Stothers | |
| 8,766,479 B2 | 7/2014 | Dorn et al. | |
| 9,154,067 B2 | 10/2015 | Frampton et al. | |
| 9,201,031 B2 | 12/2015 | Lilie et al. | |
| 9,257,838 B2 | 2/2016 | Gataric et al. | |
| 2015/0180393 A1 | 6/2015 | Tesch | |
| 2016/0218650 A1 | 7/2016 | Gajanayake et al. | |
| 2017/0114665 A1 | 4/2017 | Gemin et al. | |

* cited by examiner

*Primary Examiner* — Robert Deberadinis
(74) *Attorney, Agent, or Firm* — General Electric Company; Sean M. Weinman (57) ABSTRACT

An apparatus and method of operating a set of generators supplying power to a common power bus, includes obtaining a first generator speed signal and a second generator speed signal, determining a common mode torsional oscillation value and a differential mode torsional oscillation value, determining a first generator share command and a second generator share command based on the common mode torsional oscillation value and the differential mode torsional oscillation value, and applying the first and second generator share commands.

20 Claims, 8 Drawing Sheets

METHOD AND SYSTEM FOR OPERATING A SET OF GENERATORS

BACKGROUND OF THE INVENTION

A gas turbine engine generally includes, in serial flow order, a compressor section, a combustion section, a turbine section, and an exhaust section. In operation, air enters an inlet of the compressor section where one or more axial compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

In particular configurations, the turbine section includes, in serial flow order, a high pressure (HP) turbine and a low pressure (LP) turbine. The HP turbine and the LP turbine each include various rotatable turbine components such as turbine rotor blades, rotor disks and retainers, and various stationary turbine components such as stator vanes or nozzles, turbine shrouds and engine frames. The rotatable and the stationary turbine components at least partially define the hot gas path through the turbine section. As the combustion gases flow through the hot gas path, thermal energy is transferred from the combustion gases to the rotatable turbine components and the stationary turbine components.

Gas turbine engines and other types of turbo-machinery are often used to drive loads such as electrical generators. Gas turbine engines and other large drive train systems have a moment of inertia, a torsional stiffness, and natural damping. The low mechanical damping in high power trains can cause torsional interaction between power system components and the mechanical drive train. For example, if one of the natural frequencies of the mechanical drive train is excited to a torsional resonance, the resulting alternating mechanical torque can reach values that can damage or cause fatigue in components of the rotor system. Power distribution systems having more than one generator can further introduce torsional interactions between the set of generators.

BRIEF DESCRIPTION OF THE INVENTION

In one aspect, the present disclosure relates to a method of operating a set of generators supplying power to a common power bus, the method including obtaining, in a power sharing controller module, a first generator signal and a second generator signal, determining, in the power sharing controller module, a common mode torsional oscillation value and a differential mode torsional oscillation value based on the obtained first and second generator signals, determining, in the power sharing controller module, a first generator share command based on the summation of a predetermined share ratio value for the first generator and the differential mode torsional oscillation value, determining, in the power sharing controller module, a second generator share command based on the difference of a predetermined share ratio value for the second generator and the differential mode torsional oscillation value, modifying the first and second generator share commands by summating the respective share command with the common mode torsional oscillation value, and applying the modified first and second generator share commands, wherein the applying damps the differential mode torsional oscillation and the common mode torsional oscillation of the first and second generators.

In another aspect, the present disclosure relates to a method of operating a set of generators supplying power to a common power bus, includes obtaining, in a power sharing controller module, a set of generator speed signals from the set of generators, determining, in the power sharing controller module, a common mode torsional oscillation value and a set of differential mode torsional oscillation values based on the obtained set of generator speed signals, wherein a number of the set of differential mode torsional oscillation values equals a number of the set of generator minus one, determining, in the power sharing controller module, a set of share command for the respective set of generators based on at least one of a summation of or a difference between a predetermined share ratio value for the respective generator and a subset of the differential mode torsional oscillation values, modifying the determined set of share commands by summating the set of share commands with the common mode torsional oscillation value, and applying the modified set of share commands, wherein the applying damps the differential mode torsional oscillation and the common mode torsional oscillation of the set of generators.

In yet another aspect, the present disclosure relates to a power distribution system, including a common power distribution bus, a first generator having a first speed sensor and supplying power to the common power distribution bus, and a second generator having a second speed sensor and supplying power to the common power distribution bus, and a power sharing controller module connected with the first and second speed sensors and configured to obtain a first generator speed signal from the first speed sensor and a second generator speed signal from the second speed sensor, determine a common mode torsional oscillation value and a differential mode torsional oscillation value based on the obtained first and second generator speed signals, determine a first generator share command based on the summation of a predetermined share ratio value for the first generator and the differential mode torsional oscillation value, determine a second generator share command based on the difference of a predetermined share ratio value for the second generator and the differential mode torsional oscillation value, and modify the first and second generator share commands by summating the respective share command with the common mode torsional oscillation value.

DETAILED DESCRIPTION OF THE INVENTION

Aspects of the disclosure described herein are directed to an assembly having two rotating machines including, but not limited to, a generator assembly for a turbine engine. For purposes of illustration, the present disclosure will be described with respect to the turbine engine as an aircraft gas turbine engine. It will be understood, however, that aspects of the disclosure described herein are not so limited and may have general applicability within other engine environments, as well as in non-aircraft applications, such as other mobile applications and non-mobile industrial, commercial, and residential applications.

While "a set of" various elements will be described, it will be understood that "a set" can include any number of the respective elements, including only one element. As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference. Additionally, a set as used herein refers to any number of units, including one or more.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another.

Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

The exemplary drawings are for purposes of illustration only and the dimensions, positions, order and relative sizes reflected in the drawings attached hereto can vary.

Figure 1:
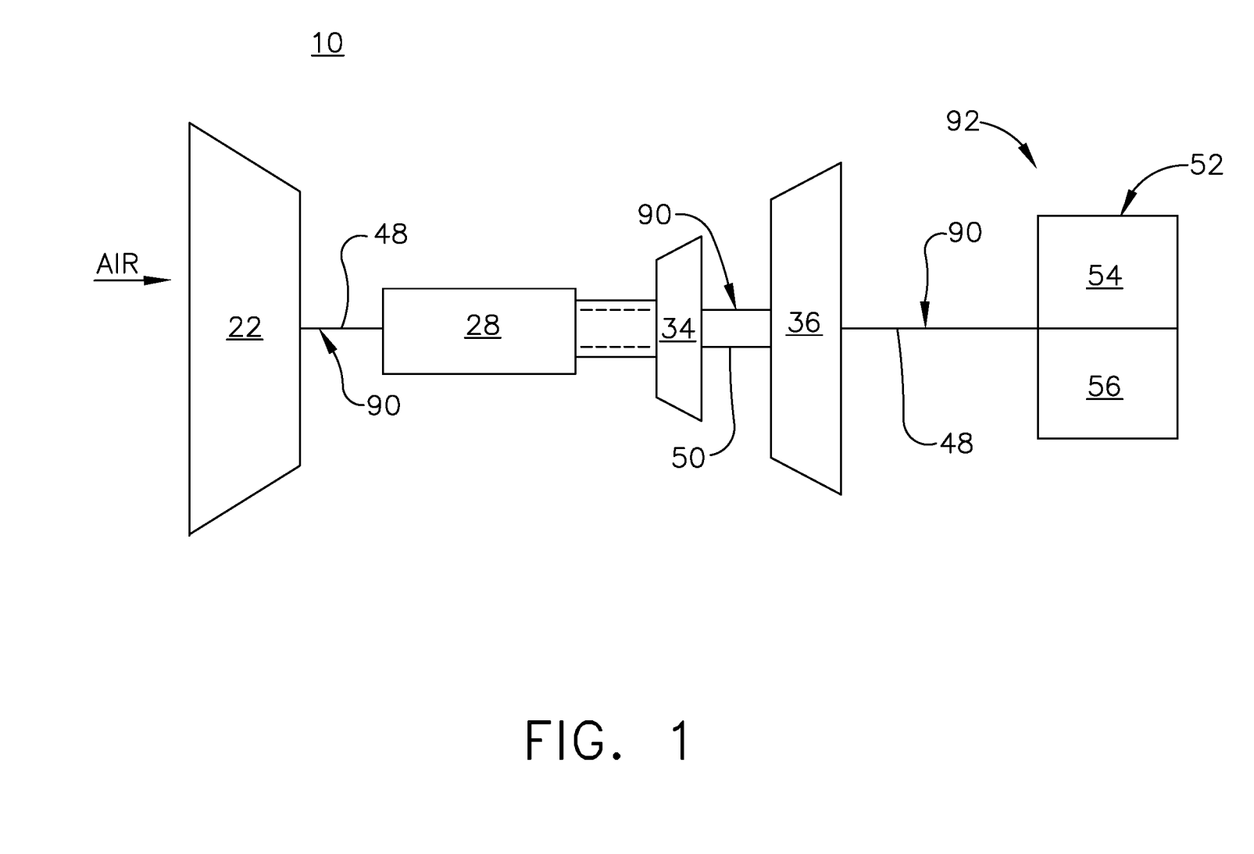
FIG. 1 is a schematic view of a turbine engine including a generator assembly with a damping module in accordance with various aspects described herein.

FIG. 1 is a schematic representation of an engine 10 including a drive train interconnecting a compressor section 22, a combustion section 28, a high-pressure turbine 34, and a low-pressure turbine 36 in axial arrangement. The drive train 90 can include rotating elements such as a high-pressure spool 48 or a low-pressure spool 50 about which elements of the engine 10 can rotate, or can be mechanically driven by the same. By way of non-limiting example, the drive train 90 can include a common drive shaft rotatably driven during operation of the engine 10. A generator assembly 92 can also be operably coupled to the drive train 90 at the common shaft. While illustrated that the generator assembly 92 couples to the drive train 90 aft of the low-pressure turbine 36, it should be understood that the generator assembly 92 can be positioned anywhere along the drive train 90, such as to the high-pressure spool 48 or the low-pressure spool 50 anywhere axially along the engine 10. For example, the generator assembly 92 could couple to the high-pressure spool 48 between the compressor section 22 and the combustion section 28.

By way of non-limiting illustration, the high-pressure spool 48 can be mechanically connected with a set of generators 52, shown as a first generator 54 and a second generator 56. While shown as two generators 54, 56, it should be understood that any number of generators can be included in the set of generators 52. Furthermore, while FIG. 1 illustrates the set of generators 52 connected to a common drive train 90, non-limiting aspects of the disclosure can be included wherein at least a subset of generators 52 are mechanically powered by a first drive train 90 while at least another subset of generators 52 are mechanically powered by a second drive train 90. In this non-limiting example, the first and second drive trains 90 can be substantially similar to each other. In one non-limiting example, the set of generators 52 from separate drive trains 90 can be electrically connected with a common power bus.

During generation of electrical energy, the first and second generators 54, 56 are loaded with a constant power and can become less stable, behaving like a negative damper at the drive train 90, which provides a negative resistive force against the driving force of the drive train 90. Such instability can manifest as torsional oscillations. Torsional oscillations as described herein are torsional harmonics on a rotating element manifested as periodically varying torsional strain. Such torsional oscillations are readily measurable as variable rotational speeds or variable torque. The negative damping effect can energize the natural mechanical oscillations at the drive train 90. While the first and second generators 54, 56 are coupled to the same drive train 90, they are separately loaded and can generate torsional oscillation resulting in both speed oscillation, torque oscillation, or lateral vibration on portions of the drive train 90 including drive shaft(s) forming a portion thereof. When a set of generators 52 are adapted for supplying electrical energy in parallel to a common power bus, for instance, from different drive trains 90 or mechanical energy sources, torsional oscillations can be further problematic, for example, speeding up or slowing down different mechanical drive trains for independently-driven generators 54, 56 or independently-driven sets of generators 52 (e.g. by different engines 10).

It should be understood that the turbine engine environment is for example only. The first and second generators 54, 56, or a set of generators 52 can be provided in any suitable machine having a rotating assembly with a corresponding set of drive trains 90 that can be utilized to drive the generators 52, 54, 56.

Figure 2:
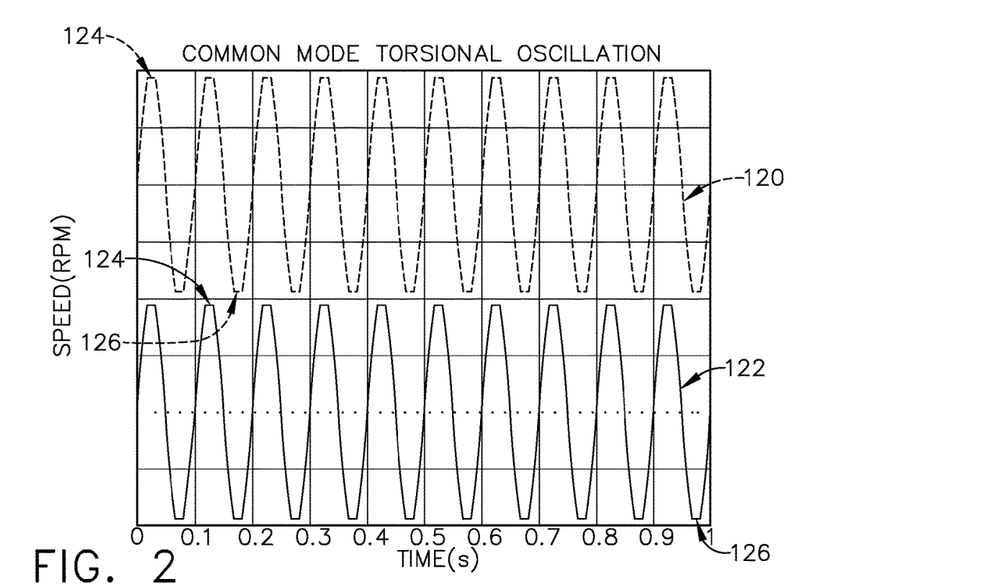
FIG. 2 is an exemplary plot illustrating common mode torsional oscillation of the generator assembly of FIG. 1, in accordance with various aspects described herein.
Figure 3:
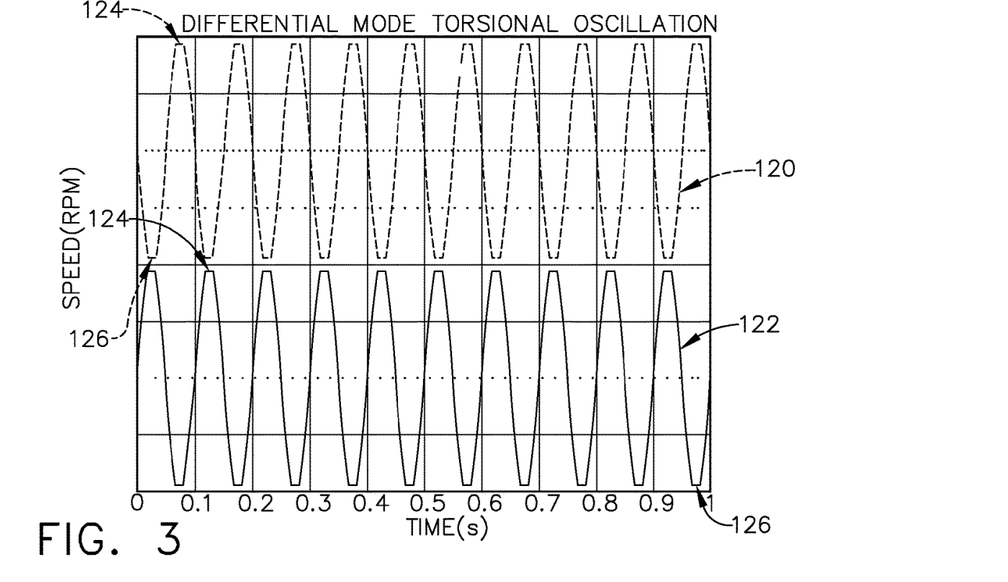
FIG. 3 is an exemplary plot illustrating differential mode torsional oscillation of the generator assembly of FIG. 1, in accordance with various aspects described herein.
Figure 4:
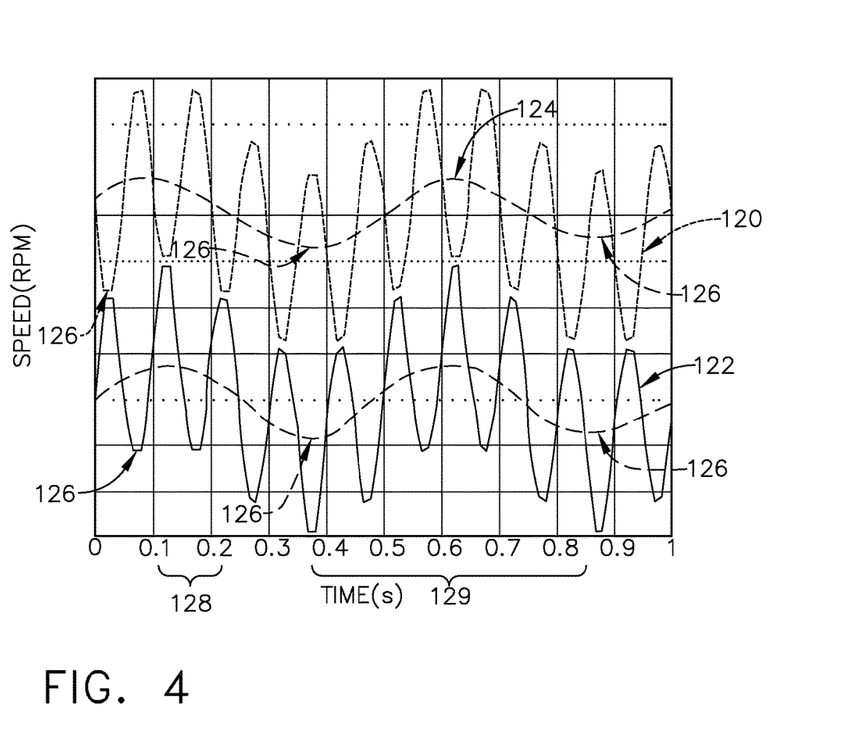
FIG. 4 is an exemplary plot illustrating both common mode and differential mode torsional oscillations of the generator assembly of FIG. 1, in accordance with various aspects described herein.

Turning now to FIGS. 2-4, three different plot graphs illustrate three types of torsional oscillations that can be experienced by the a set of drive trains 90 coupled to the respective set of generators 54, 56 that are connected in parallel to a common power bus. The three different plots illustrate the torsional oscillations as rotational speed of the generators 54, 56 connected with different drive trains 90 over time. FIG. 2 illustrates a plot graph showing a common mode torsional oscillation. A first plot 120 can be representative of the torsional oscillations generated by the first generator 54 mechanically driven by a first drive train 90 and a second plot 122 can be representative of the torsional oscillations generated by the second generator 56 mechanically driven by a second drive train. Such torsional oscillations are visible as sinusoidal variations in rotational speed of the first and second generators 54, 56 in the first and second plots 120, 122, respectively. Under common mode torsional oscillations, the first plot 120 and the second plot 122 are in phase, having local maxima 124 and minima 126 that occur at the same time, and can increase and decrease with one another relative to time.

FIG. 3 illustrates a plot graph showing differential mode torsional oscillations. FIG. 3 can be substantially similar to that of FIG. 2, except that the first plot 120 and the second plot 122 are out of phase, where a local maxima 124 of one generator occurs at the same time as the local minima 126 of the other generator. As such, while the rotational speed of one generator increases, the other decreases, and vice versa. Differential mode torsional oscillations can be resultant of asymmetry of the mechanical systems, such as the set of different drive trains 90 or kinetic sources mechanically powering the set of generators 52, interconnected components, or an asymmetry in the generator loading.

FIG. 4 illustrates a plot graph showing a combined common mode torsional oscillation and differential mode torsional oscillation. It should be appreciated that utilizing more than one generator can generate both types of torsional oscillation simultaneously. At a first frequency 128 of 10 Hertz (Hz), the first and second generators 110, 112 are oscillating out of phase having differential mode torsional oscillations, having asymmetric maxima 124 and minima 126, represented by the first and second plots 120, 122 at the dotted and solid lines, respectively. Simultaneously, at a second frequency 129 of 2 Hz, the first and second generators 110, 112 are oscillating in phase, having common mode torsional oscillations represented by the first and second plots 120, 122 along the dashed lines having complementary maxima 124 and minima 126. Thus, it should be understood that when utilizing multiple generators, including generators connected with a common power bus but not mechanically connected by the drive train, torsional oscillations having different frequencies and phases can be experienced simultaneously. Stated another way, the common power bus, in receiving power generated by a generator in a set of generators (at least a subset of the generators mechanically powered by different drive trains), can in turn affect, cause, generate, influence, or otherwise apply at least one of differential mode torsional oscillations or common mode torsional oscillations on the other generators.

In one non-limiting aspect of the disclosure, the torsional oscillations can be damped (i.e. reduced, eliminated, negated, etc.) by way of utilizing at least one mechanical damper or at least one electronic damper. As used herein, a "damper" is a device that operates to increase the load torque when the rotating speed goes up, and to reduce the load torque when the rotating speed goes down. Thus, a damper effectively provides negative feedback to changes in the rotational speed of a generator to reduce or eliminate the torsional oscillation. In one non-limiting example, electronic damping includes adjusting a load torque through the electromagnetic torque of the generator according to a rotational speed of the generator rotor. The electromagnetic torque is the load torque when the generator runs in generation mode.

When the electronic damping is turned on, enabled, operational, or the like, the load torque is increased when the generator speed (i.e. the generator rotor rotational speed) increases and it is decreased when the generator speed decreases. In one non-limiting aspect of the disclosure, the load torque variation can be implemented, applied, enabled, or the like, by changing the output voltage of the generator. For example, an electronic damping signal generated, configured, or enabled to control the electronic damping of the generator can be sent to, supplied to, or received by a voltage regulator of the generator to control the output voltage. In this sense, increasing the load torque variation by way of the electronic damping signal can operably or effectively result in a higher generator voltage generation, thus higher load power and higher load torque. Similarly, increasing the load torque variation by way of the electronic damping signal can operably or effectively result in a in a lower generator voltage generation, and thus lower power and lower torque. As used herein, a "increasing" or "decreasing" the load torque variation to provide or enable the damping is used to indicate relative "increasing" the damping or "decreasing" the damping, and may not indicate a stronger, weaker, or larger or smaller electronic damping signal.

While the electronic damping has been described with regard to changing the output voltage of the generator, in another non-limiting example, the load torque variation or electronic damping functionality can be included, enabled, or effectively operated by way of changing share commands. In this example, the electronic damping signal generated, configured, or enabled to control the electronic damping of the generated can be sent to a load regulator to operably control the current generated by, or output by, the generator, as described herein.

Furthermore, in non-limiting aspects of the disclosure where a set of generators are connected in parallel to a single or common power bus, a power sharing controller can be included and configured or enabled to allocate power sharing among the set of generators. Effectively, the power sharing controller can allocate, control, command, or otherwise instruct the respective set of generators to generate (for example, by way of the voltage regulation) a dynamic or predetermined amount, quantity, ratio, or relative share of electrical power supplied to the common power bus during power generation operations of the power network. As used herein, "share", "share command", "share ratio", and the like can denote a desired or applied quantity of power generated or supplied by a respective generator, to the common power bus. A "share command" can include, but is not limited to, a current supply, a voltage supply, power generation characteristics, operating or power generation instructions, a ratio of relative power generation to total power supplied to the common power bus, or the like.

In one non-limiting example, the power sharing controller can receive a set of desired sharing ratio commands, including but not limited to individual generator currents, as inputs for the respective set of generators. The power sharing controller can, in turn, generate a set of power sharing signals for the respective set of generators, whereby applying the respective set of power sharing signals, controllably operates the set of generators to generate power in accordance with the power sharing signals. In one non-limiting example, the power sharing signal can be representative of, or related to a desired voltage or desired current to be provided to the common power bus, from the respective generator.

Figure 5:
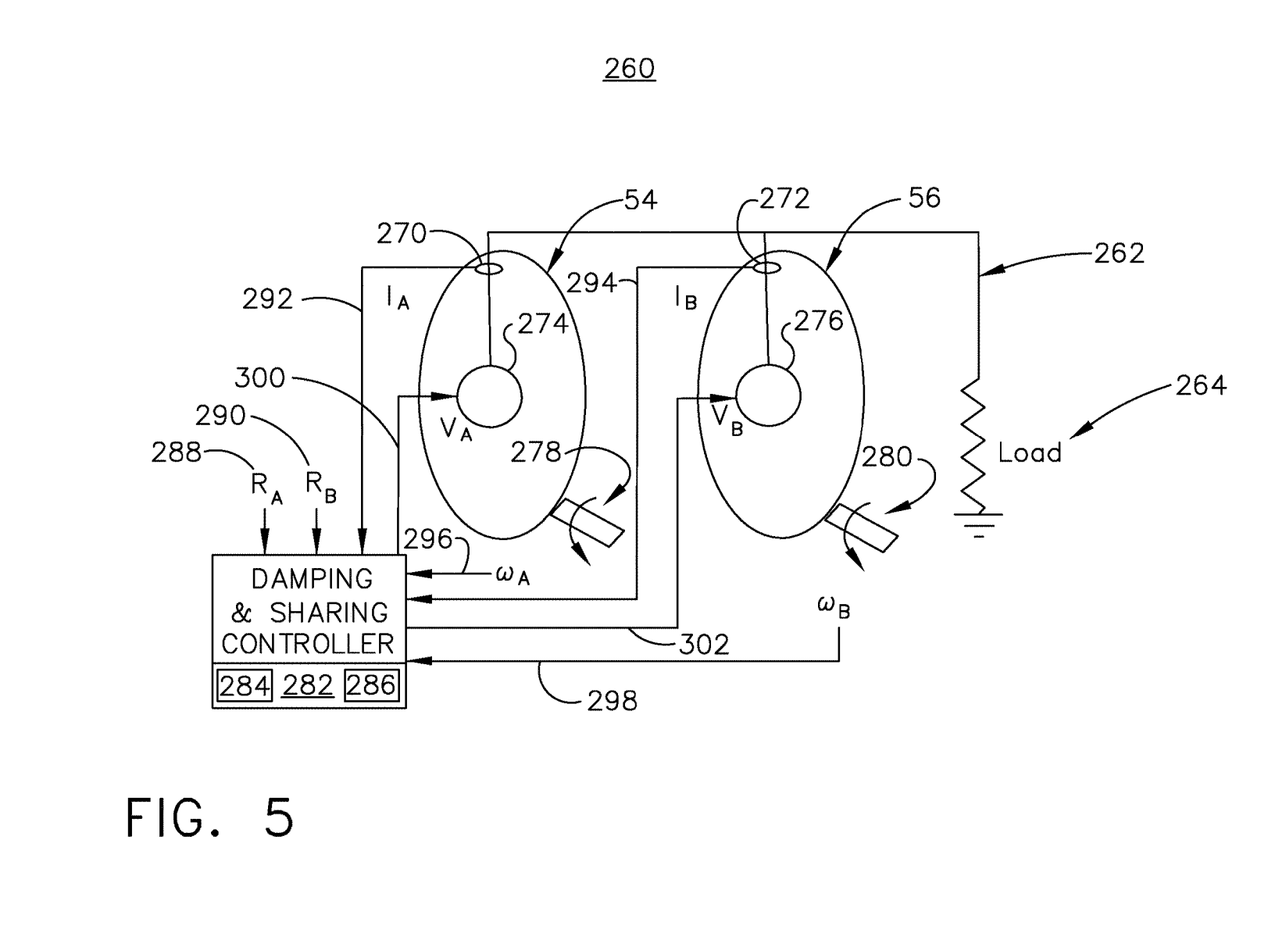
FIG. 5 is a schematic view of a power distribution system including a set of generators supplying power to a common power bus, in accordance with various aspects described herein.

FIG. 5 illustrates a non-limiting schematic illustration of a power system 260 including the first generator 54, the second generator 56, and a damping and sharing controller module 282. The damping and sharing controller module 282 can further include a processor 284 and memory 286. As described herein, the first generator 54 and the second generator 56 can be mechanically driven by different sources of kinetic motion or energy. The generators 54, 56 are connected with a common power bus 262, and supply power from the common power bus to a set of electrical loads, illustrated schematically as a single load 264.

In one non-limiting example, the first generator 54 can include a power sensor, including but not limited to a first current sensor 270 configured, arranged or the like, the sense or measure a value related to the power output or power generated by the first generator 54 during operation. For example, the first current sensor 270 can sense or measure the current produced or generated by the first generator 54. The first generator 54 can further include a first voltage regulator 274 configured, adapted, or the like, to controllably or operably control the output of the first generator 54 in response to a received regulation signal. Additionally, as schematically illustrated, the first generator 54 can include a first speed sensor 278 configured, adapted, or the like, to sense or measure the rotational speed of the first generator 54, such as the rotational speed of a rotor or a drive train.

In another non-limiting example, the second generator 56 can include a similar configuration to the first generator 54. In this sense, the second generator 56 can include a power sensor, including but not limited to a second current sensor 272 configured, arranged or the like, the sense or measure a value related to the power output or power generated by the second generator 56 during operation. For example, the second current sensor 272 can sense or measure the current produced or generated by the second generator 56. The second generator 56 can further include a second voltage regulator 276 configured, adapted, or the like, to controllably or operably control the output of the second generator 56 in response to a received regulation signal. Additionally, as schematically illustrated, the second generator 56 can include a second speed sensor 280 configured, adapted, or the like, to sense or measure the rotational speed of the second generator 56, such as the rotational speed of a rotor or a drive train.

The damping and sharing controller module 282 can be communicatively connected with at least a subset of the aforementioned components of the first and second generators 54, 56 to receive or supply signals therebetween. In one non-limiting example configuration, the damping and sharing controller module 282 can be connected with the first current sensor 270 and the second current sensor 272, and can receive, respectively, a first current signal 292 generated by the first current sensor 270 (denoted IA) and a second current signal 294 generated by the second current sensor 272 (denoted IB). As used herein, "A" will denote references relating to the first generator 54, while "B" will denote references relating to the second generator 56. In another non-limiting example configuration, the damping and sharing controller module 282 can be connected with the first speed sensor 278 and the second speed sensor 280, and can receive, respectively a first speed signal 296 generated by the first speed sensor 278 (denoted $\omega A$) and a second speed signal 298 generated by the second speed sensor 280 (denoted $\omega B$).

In yet another non-limiting example configuration, the damping and sharing controller module 282 can be connected with the first voltage regulator 274 and the second voltage regulator 276, and can supply, provide, generate, or the like, respectively, a first voltage regulation signal 300 provided to the first voltage regulator 274 (denoted VA) and a second voltage regulation signal 302 provided to the second voltage regulator 276 (denoted VB). Further non-limiting aspects of the disclosure can be included wherein the damping and sharing controller module 282 can include a desired share command for the respective set of generators 54, 56. The desired share command can include a predetermined or dynamic share command or ratio for the set of generators 54, 56 supplying powering to the common power bus 262. In this sense, the damping and sharing controller module 282 can include a set of predefined desired share commands for the respective set of generators 54, 56, or can receive a dynamic desired share command from another component, such as a another power control system or computer, or another controller module. The desired share commands for the first and second generators 54, 56 are schematically represented as a first desired share command 288 (denoted RA) and a second desired share command 290 (denoted RB), provided to the damping and sharing controller 282.

Figure 6:
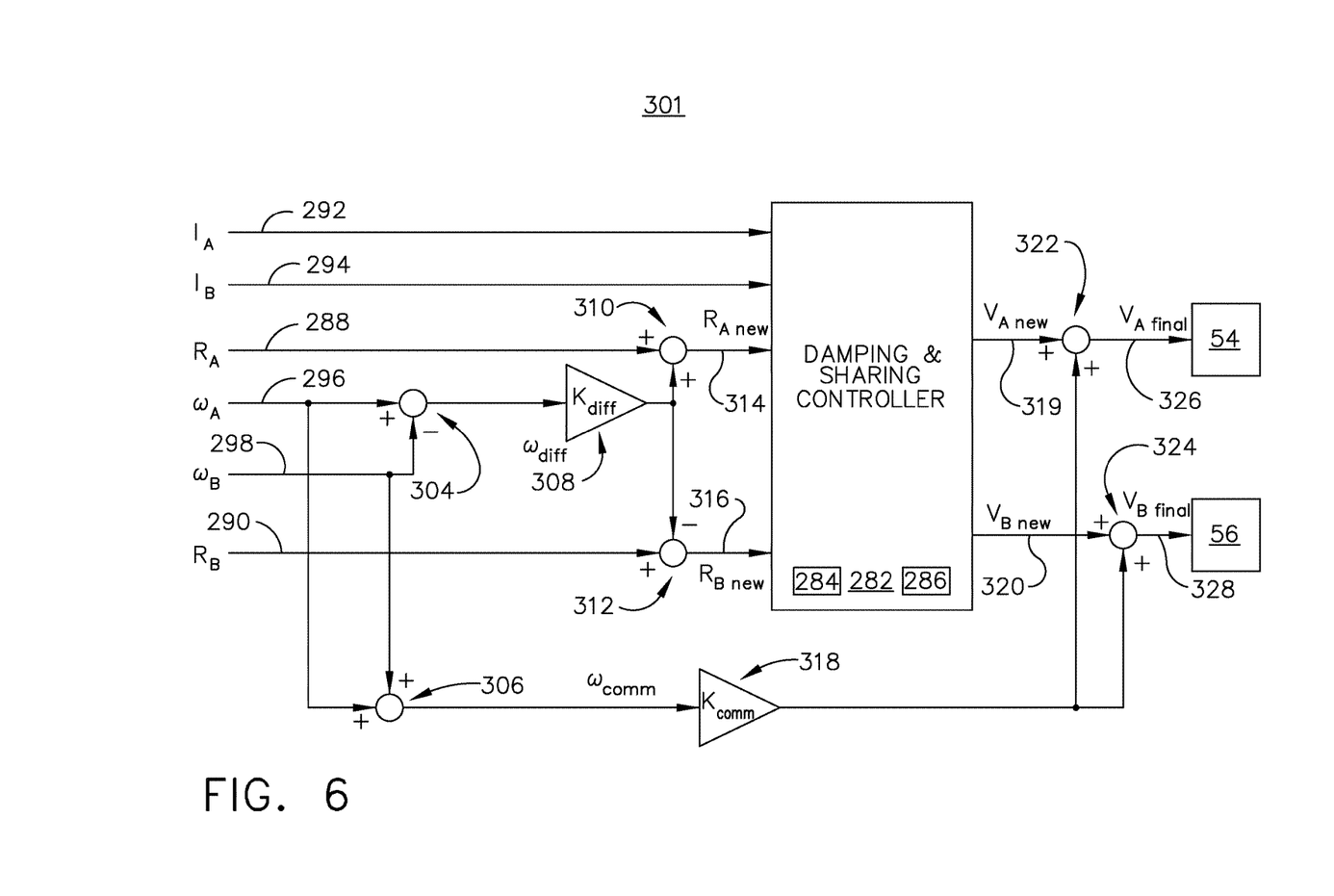
FIG. 6 is a schematic view of a set of signals for operating aspects of the power distribution system of FIG. 5, in accordance with various aspects described herein.

FIG. 6 illustrates a schematic signal diagram 301 showing the operation of the damping and sharing controller module 282. While a number of components, nodes, multipliers, and the like are illustrated apart or separate from the damping and sharing controller module 282 for ease of explanation, non-limiting aspects of the disclosure can be included wherein at least a subset of the functionality or functional components represented thereby can be included with the damping and sharing controller module 282 and embodiment in hardware or executable instructions.

As illustrated, the first and second current signals 292, 294 can be provided directly to the damping and sharing controller module 282 and representative of the current generated by the respective set of generators 54, 56. The first and second speed signals 296, 298 can each be provided to a respective first node 304 and second node 306. The first node 304 can take the difference between the first and second speed signals 296, 298 (the difference in speed signals 296, 298 denoted ωdiff). In this example, the differential mode torsional oscillation of the set of generators 54, 56 is represented by the output of the first node 304 (ωdiff). The differential mode torsional oscillation is multiplied by a first damping gain multiplier 308 (denoted Kdiff), and supplied or provided to a third node 310 and a fourth node 312.

In one non-limiting example, the first damping gain multiplier 308 can be related to the number of generators 54, 56 supplying power to the common power bus 262. In one non-limiting example, the first damping gain multiplier 308 can include a user-adjusted, predetermined, or dynamically adapted multiplier value, or the like. The first damping gain multiplier 308 can, for example, enable or provide for the converting, mapping, translating, or the like, the speed difference output from first node 304 to a ratio value, ratio command, or the like, such that the output of the first damping gain multiplier 308 is combinable with the respective first desired share command 288 and the second desired share command 290. In example power system 260 configurations wherein there are more than two generators 54, 56, (e.g. number "N" generators), the power system 260, signal diagram 301, or the like, can include N−1 differential mode torsional oscillation determinations and N−1 first damping gain multipliers 308. In the aforementioned example, each of the N−1 first damping gain multipliers 308 can be related to the N number of generators.

The third node 310 summates the output from the first damping gain multiplier 308 with the first desired share command 298, wherein the summated node 310 output is an altered, modified, or adjusted first share command 314 (denoted RA new), provided to the damping and sharing controller module 282. The fourth node 312 can take the difference between the output from the first damping gain multiplier 308 and the second desired share command 290 (e.g. the second desired share command 290 minus the first damping gain multiplier 308), wherein the difference node 312 output is altered, modified, or adjusted second share command 316 (denoted RB new), provided to the damping and sharing controller module 282. Thus, as explained herein, non-limiting aspects of the disclosure can be included wherein a desired share command 288, 290 for a respective set of generators 54, 56 connected with a common power bus can altered, adjusted, or otherwise modified by a calculated or determined differential mode torsional oscillation of the set of the generators 54, 56 to generate modified or altered share commands 314, 316. The modified or altered share commands 314, 316 can account for, correct, or otherwise adjust the desired share commands 288, 290 to remove, reduce, correct, or eliminate the differential mode torsional oscillation of the set of the generators 54, 56, as described herein.

The damping and sharing controller module 282 can receive the first current signal 292, the second current signal 294, and the modified or altered share commands 314, 316, and can generate a first generator voltage command 319 (denoted VA new) and a second generator voltage command 320 (denoted VB new), using processes not germane to the current disclosure. In this sense, the first and second generator voltage commands 319, 320 can remove, reduce, correct, or eliminate the differential mode torsional oscillation of the set of the generators 54, 56, as described herein.

The second node 306 can receive and summate the first speed signal 296 (ωA) and the second speed signal 298 (ωB), and provide the summated node output (denoted ωcomm) to a second damping gain multiplier 318 (denoted Kcomm). The common mode torsional oscillation is multiplied by the second damping gain multiplier 318, and supplied or provided to a respective fifth node 322 and sixth node 324. In this example, the common mode torsional oscillation of the set of generators 54, 56 is represented by the output of the second node 306 (ωcomm) or the multiplied output of the second damping gain multiplier 318. The common mode torsional oscillation of the set of the generators 54, 56 can be the average of the speeds of the set of generators 54, 56. For example, when the second node 306 summates the respective first and second speed signals (e.g. the first and second generator speeds), the second damping gain multiplier 318 can divide the summated speeds by the number of generators 54, 56 to average the speeds of the generators 54, 56. Similar to the first damping gain multiplier 308, in one non-limiting example the second damping gain multiplier 318 can include a user-adjusted, predetermined, or dynamically adapted multiplier value, or the like. The second damping gain multiplier 318 can, for example, enable or provide for the converting, mapping, translating, or the like, the summated speed output from second node 306 to a voltage command value, a voltage value, or the like, such that the output of the second damping gain multiplier 318 is combinable with the respective the first generator voltage commands 319 and the second generator voltage commands.

The fifth node 322 can receive the first generator voltage command 319 and the output of the second damping gain multiplier 318 (e.g. the common mode torsional oscillation signal), and can summate the two such that the resulting output, a modified first generator voltage command 326, incorporates aspects of the common mode torsional oscillation and differential mode torsional oscillation, and wherein applying the modified first generator voltage command 326 to the first generator 54 corrects, negates, reduces, eliminates, or the like, the common and differential mode torsional oscillations introduced to the first generator 54 by the set of generators 54, 56. In one non-limiting example, the modified first generator voltage command 326 can be represented by the first voltage regulation signal 300 of FIG. 5, and applied to the first generator 54, for example, by way of the first voltage regulator 274. Similarly, the sixth node 324 can receive the second generator voltage command 320 and the output of the second damping gain multiplier 318 (e.g. the common mode torsional oscillation signal), and can summate the two such that the resulting output, a modified second generator voltage command 328, incorporates aspects of the common mode torsional oscillation and differential mode torsional oscillation, and wherein applying the modified second generator voltage command 328 to the second generator 56 corrects, negates, reduces, eliminates, or the like, the common and differential mode torsional oscillations introduced to the second generator 56 by the set of generators 54, 56. In one non-limiting example, the modified second generator voltage command 328 can be represented by the second voltage regulation signal 302 of FIG. 5, and applied to the second generator 56, for example, by way of the second voltage regulator 276.

Thus, aspects of the disclosure can be included wherein the damping and sharing controller module 282 can operably or effectively correct, reduce, eliminate, or negate differential mode torsional oscillations and common mode torsional oscillations between a set of generators connected with a common power bus and mechanically or kinetically driven by different rotational sources. While the above-described examples illustrate how aspects of the disclosure can be applied to two generators, aspects of the disclosure can be applied to any number of generators in a set of generators.

Figure 7:
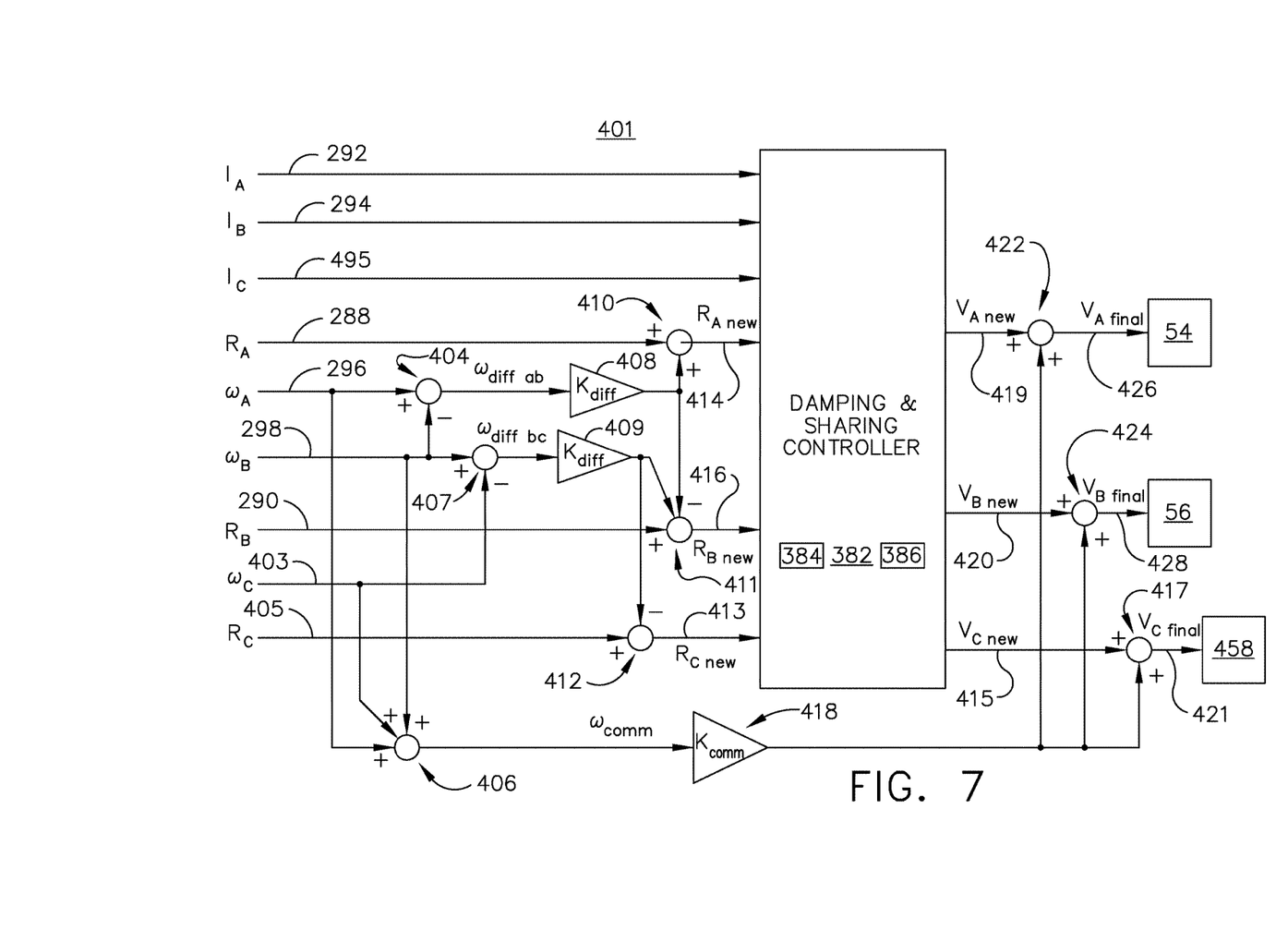
FIG. 7 is a schematic view of a set of signals for operating aspects of another power distribution system having a third generator, in accordance with various aspects described herein.

For instance, FIG. 7 illustrates a schematic signal diagram 401 showing the operation of a damping and sharing controller module 382 having three generators 54, 56, 458, wherein the set of generators supply power to a common power bus, and introduce common and differential mode torsional oscillations between the set of generators 54, 56, 458. The schematic signal diagram 401 configuration is similar to the schematic signal diagram 301; therefore, like parts will be identified with like numerals increased to 400, with it being understood that the description of the like parts of the schematic signal diagram 301 applies to the schematic signal diagram 401, unless otherwise noted. It is assumed in the current example that the third generator 458 includes a similar configuration, including sensors and the like, as the earlier-described generators 54, 56.

As shown, the current signals 292, 294, 495 are provided to the damping and sharing controller module 382. The first and second speed signals 296, 298, and a third speed signal 403 (denoted $\omega C$) can be provided to a first set of nodes 404, 407, whereby the first set of nodes 404, 407 determine the difference in speed between the first, second, and third speed signals 296, 298, 403. Node 404 is shown determining the difference between the first speed signal 296 and the second speed signal 298 (generating output $\omega$diff ab) and node 407 is shown determining the difference between the second speed signal 298 and the third speed signal 403 (generating output $\omega$diff bc). In this sense, aspects of the disclosure can be included wherein there are N−1 (N being the number of generators) speed difference signals generated, and provided to a respective first set of damping gain multipliers 408, 409. In this example, each of the first set of damping gain multipliers 408, 409 can be related to the number of generators 54, 56, 458 supplying power to the common power bus 262. For example, in the current example, the first set of damping gain multipliers 408, 409 can include a user-adjusted, predetermined, or dynamically adapted multiplier value, or the like, as described herein. Non-limiting aspects of the disclosure can be included wherein the first set of damping gain multipliers 408, 409 have similar or independent converting, mapping, translating, or the like, multipliers.

For an N-generator system, the differential mode torsional oscillation related power ratio change of one generator will be subtracted from its own ratio command and be added to the sharing ratio command of the next generator that the first generator is compared to. Thus, as shown, the multiplied output of damping gain multiplier 408 is summated with the first desired share command 288 to create the adjusted first share command 414. Similarly, the multiplied output of damping gain multiplier 408 and the multiplied output of damping gain multiplier 409 are detracted, subtracted, removed, or the like, from the second desired share command 290 at node 411 to create the adjusted second share command 416. Finally, a third desired share command 405 minus the multiplied output of damping gain multiplier 409 at node 412 creates the adjusted third share command 413 (denoted RC new). Thus, in an N-generator system, N−1 differential mode torsional speeds can be calculated, determined, or the like, and accounted for in resulting modified or adjusted share command signals 414, 416, 413.

Thus, as explained herein, non-limiting aspects of the disclosure can be included wherein a desired share command 288, 290, 405 for a respective set of generators 54, 56, 458 connected with a common power bus can altered, adjusted, or otherwise modified by a calculated or determined differential mode torsional oscillation of the set of the generators 54, 56, 458 to generate modified or altered share commands 414, 416, 413. The modified or altered share commands 414, 416, 413 can account for, correct, or otherwise adjust the desired share commands 288, 290, 405 to remove, reduce, correct, or eliminate the differential mode torsional oscillation of the set of the generators 54, 56, 458, as described herein.

The damping and sharing controller module 282 can receive the first current signal 292, the second current signal 294, and the third current signal 495, and the modified or altered share commands 414, 416, 413, and can generate a first generator voltage command 419 (denoted VA new) and a second generator voltage command 420 (denoted VB new), and a third generator voltage command 415 (denoted VC new), using processes not germane to the current disclosure. In this sense, the first, second, and third generator voltage commands 419, 420, 415 can remove, reduce, correct, or eliminate the differential mode torsional oscillation of the set of the generators 54, 56, 458, as described herein.

The second node 406 can receive and summate the first speed signal 296 ($\omega A$), the second speed signal 298 ($\omega B$), and the third speed signal 403 ($\omega C$) and provide the summated node output (denoted $\omega$comm) to a second damping gain multiplier 418 (denoted Kcomm). The common mode torsional oscillation is multiplied by the second damping gain multiplier 418, and supplied or provided to a respective nodes 422, 424, and 417. In this example, the common mode torsional oscillation of the set of generators 54, 56, 458 is represented by the output of the second node 406 ($\omega$comm) or the multiplied output of the second damping gain multiplier 418. The common mode torsional oscillation of the set of the generators 54, 56, 458 can be the average of the speeds of the set of generators 54, 56, 458. For example, when the second node 406 summates the respective speed signals, the second damping gain multiplier 418 can divide the summated speeds by the number of generators 54, 56, 458 (or N in an N-generator system) to average the speeds of the generators 54, 56, 458. In the example where there are two generators 54, 56, 458, the second damping gain multiplier 418 can be one third.

Similar to the example shown in FIG. 6, the respective nodes 422, 424, 417 of FIG. 7 can receive the respective generator voltage command 419, 420, 415 from the damping and sharing controller module 382 and the output of the second damping gain multiplier 418 (e.g. the common mode torsional oscillation signal), and can summate respective signals such that the resulting modified generator voltage command outputs 426, 428, 421 incorporate aspects of the common mode torsional oscillation and differential mode torsional oscillation. Applying the modified first, second, and third generator voltage commands 426, 428, 421 to the respective first, second, and third generators 54, 56, 458 corrects, negates, reduces, eliminates, or the like, the common and differential mode torsional oscillations introduced to the set of generators 54, 56, 458, as described herein.

Thus, aspects of the disclosure can be included wherein the damping and sharing controller module 382 can operably or effectively correct, reduce, eliminate, or negate differential mode torsional oscillations and common mode torsional oscillations between a set of N generators connected with a common power bus and mechanically or kinetically driven by different rotational sources. With the aforementioned aspects of the disclosure, similar generator configurations and signal diagrams 401 can be generated and implemented to operate power sharing and common and differential mode torsional oscillation correction to any number of generators in a set of generators.

Figure 8:
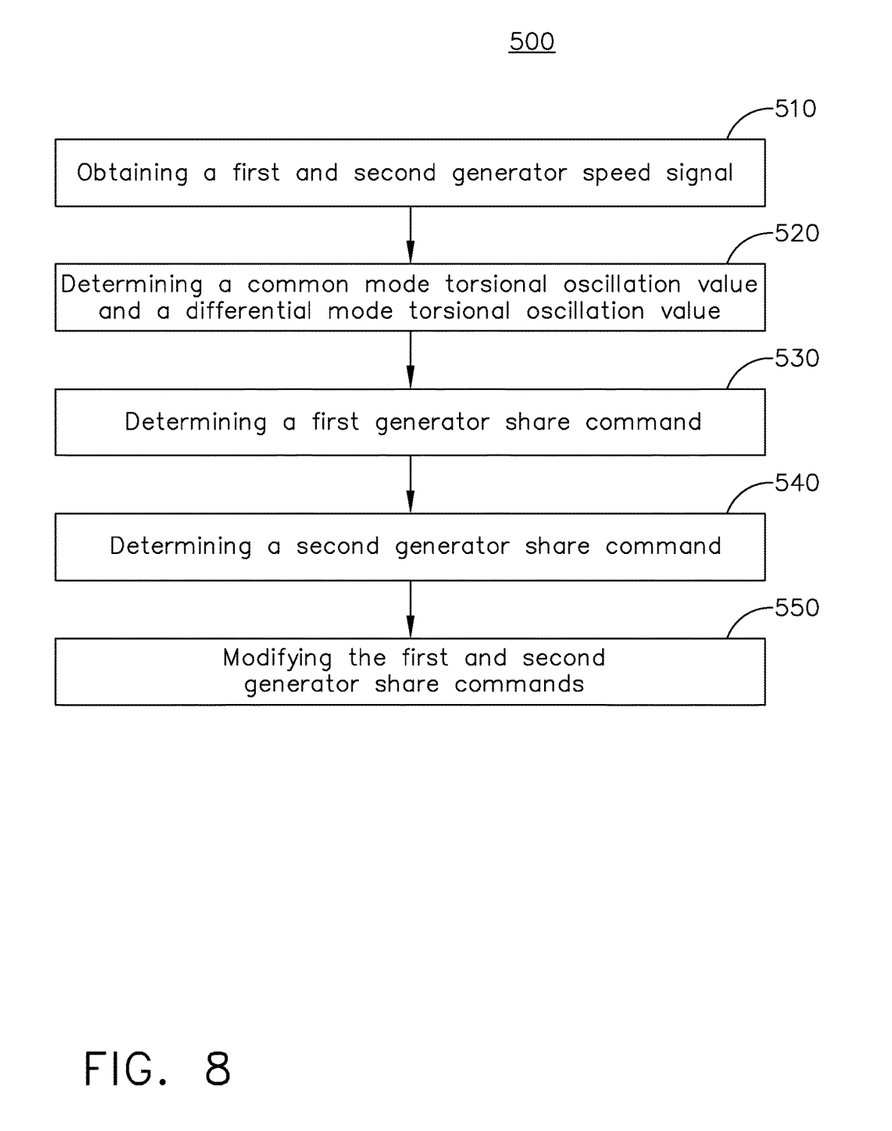
FIG. 8 is a diagram demonstrating a method of operating a set of generators supplying power to a common power bus in accordance with various aspects described herein.

FIG. 8 illustrates a method 500 of operating a set of generators supplying power to a common power bus. The method 500 begins by obtaining, in a power sharing controller module 282, 382, at least a first generator speed signal 296 and a second generator speed signal 298, at 510. Next, the method 500 determines, in the power sharing controller module 282, 382, a common mode torsional oscillation value and a differential mode torsional oscillation value based on the obtained first and second generator speed signals 296, 298, at 520. The method 500 can further determine, in the power sharing controller module 282, 382, at least a first generator share command 314, 414 based on the summation of a predetermined share ratio value for the first generator and the differential mode torsional oscillation value, at 530. The method 500 can also determine, in the power sharing controller module 282, 382, at least a second generator share command 316, 416 based on the difference of a predetermined share ratio value for the second generator and the differential mode torsional oscillation value, at 540. Finally, the method 500 includes modifying or altering the first and second generator share commands 314, 316, 414, 416 by summating the respective share command with the common mode torsional oscillation value, at 550.

The sequence depicted is for illustrative purposes only and is not meant to limit the method 500 in any way as it is understood that the portions of the method can proceed in a different logical order, additional or intervening portions can be included, or described portions of the method can be divided into multiple portions, or described portions of the method can be omitted without detracting from the described method. For instance, in one non-limiting example, the method 500 can include applying the modified the at least first and second generator share commands 326, 328, 426, 428, wherein the applying damps the differential mode torsional oscillation and the common mode torsional oscillation of the at least first and second generators 54, 56. In another non-limiting example, the method 500 can include at least one of: generating, by the power sharing controller module 282, 382, a first generator voltage command 319, 419 and a second generator voltage command 320, 420 based on the respective determined first and second generator share commands 314, 316, 414, 416; wherein the modifying includes modifying the first and second generator voltage command 319, 320, 419, 420 by summating the respective voltage command 319, 320, 419, 420 with the common mode torsional oscillation value; operating the first generator 54 in accordance with the applied first generator voltage command 326, 426 and operating the second generator 56 in accordance with the applied second generator voltage command 328, 428; determining at least one of the common mode gain value for the second damping gain multiplier 318, 418 or a differential mode gain value for the first (or first set of) damping gain multiplier(s) 308, 408, 409, based on the number of generators; or a combination thereof.

Figure 9:
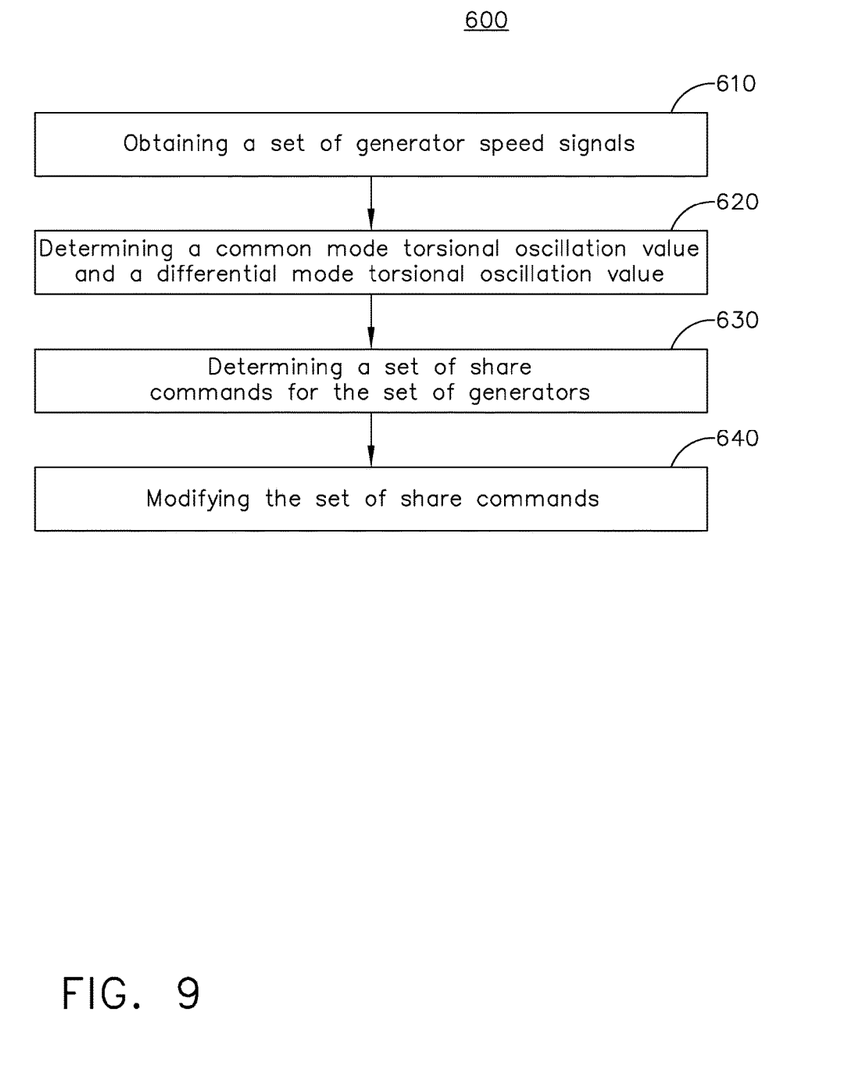
FIG. 9 is a diagram demonstrating another method of operating a set of generators supplying power to a common power bus in accordance with various aspects described herein.

FIG. 9 illustrates another method 600 of operating a set of generators supplying power to a common power bus. The method 600 begins by obtaining, in the power sharing controller module 282, 382, a set of generator speed signals from the set of generators, at 610. The method 600 continues by determining, in the power sharing controller module 282, 382, a common mode torsional oscillation value and a set of differential mode torsional oscillation values based on the obtained set of generator speed signals, wherein a number of the set of differential mode torsional oscillation values equals a number of the set of generator minus one, at 620. The method 600 can then determine, in the power sharing controller module 282, 382, a set of share command for the respective set of generators based on at least one of a summation of or a difference between a predetermined share ratio value for the respective generator and a subset of the differential mode torsional oscillation values, at 630. The method 600 then modifies the determined set of share commands by summating the set of share commands with the common mode torsional oscillation value at 640.

The sequence depicted is for illustrative purposes only and is not meant to limit the method 600 in any way as it is understood that the portions of the method can proceed in a different logical order, additional or intervening portions can be included, or described portions of the method can be divided into multiple portions, or described portions of the method can be omitted without detracting from the described method. For instance, in one non-limiting example, the method 600 can include applying the modified set of share commands, wherein the applying damps the differential mode torsional oscillation and the common mode torsional oscillation of the set of generators. In another non-limiting example, the method 600 can include at least one of: operating the set of generators in accordance with the applied set of share commands; determining the common mode torsional oscillation value including averaging the obtained set of generator speed signals; determining the set of differential mode torsional oscillation values including determining a first differential mode torsional oscillation value by calculating the difference between a first and a second generator speed signals and a second differential mode torsional oscillation value by calculating the difference between the second and a third generator speed signals; determining the set of share commands including at least one summation of a predetermined share ratio value for a respective first generator and a first differential mode torsional oscillation value and at least difference between a predetermined share ratio value for a respective second generator and a second differential mode torsional oscillation value; determining the set of share commands further including the summation of a predetermined share ratio value for a respective third generator with the difference between the second differential mode torsional oscillation value and the first differential mode torsional oscillation value; or a combination thereof.

Many other possible aspects and configurations in addition to that shown in the above figures are contemplated by the present disclosure. For example, control schema described herein can be included as at least a portion of a closed-loop system. In this system, the feedback from the resulting generator operation can be used to affect the changes to the future generator operations. The feedback can be continuous, repeated, intermittent, or the like.

The technical effect is that the above described aspects enable or provide for the damping, reduction, elimination, or negation of differential mode and common mode torsional oscillation between a set of generators supplying a shared portion of power to a common power bus, and wherein the set of generators are mechanically or kinetically driven by at least two kinetic sources. With a typical generator damping system, active electrical damping can be used to damp the common mode torsional oscillations. However, when using the active electrical damping, the differential torsional mode oscillations can be excited to an increased severity. However, typical generator damping have been applied only on a set of generators driven by a common kinetic source. The common mode and differential mode torsional oscillations because more difficult to account for when the oscillations occur on different kinetic sources, as described herein. As such, the methods and systems described herein can simultaneously and continuously monitor both the common mode and differential mode torsional oscillations and to dynamically damp, reduce, eliminate, or negate both types of torsional oscillations in a multiple-generator system driven by multiple kinetic sources by way of modifying and applying a power share command signal.

Reduction of the oscillations at the generators can improve mechanical stability of the rotational assemblies, and improve overall system efficiency.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Combinations or permutations of features described herein are covered by this disclosure.

This written description uses examples to disclose embodiments of the invention, including the best mode, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of operating a set of generators supplying power to a common power bus, the method comprising:
   obtaining, in a power sharing controller module, a first generator signal and a second generator signal;
   determining, in the power sharing controller module, a common mode torsional oscillation value and a differential mode torsional oscillation value based on the obtained first and second generator signals;
   determining, in the power sharing controller module, a first generator share command based on the summation of a predetermined share ratio value for the first generator and the differential mode torsional oscillation value;
   determining, in the power sharing controller module, a second generator share command based on the difference of a predetermined share ratio value for the second generator and the differential mode torsional oscillation value;
   modifying the first and second generator share commands by summating the respective share command with the common mode torsional oscillation value; and
   applying the modified first and second generator share commands, wherein the applying damps the differential mode torsional oscillation and the common mode torsional oscillation of the first and second generators.

2. The method of claim 1, further comprising generating, by the power sharing controller module, a first generator voltage command and a second generator voltage command based on the respective determined first and second generator share commands.

3. The method of claim 2 wherein the modifying includes modifying the first and second generator voltage command by summating the respective voltage command with the common mode torsional oscillation value.

4. The method of claim 3, further comprising operating the first generator in accordance with the applied first generator voltage command and operating the second generator in accordance with the applied second generator voltage command.

5. The method of claim 1, further comprising operating the first generator in accordance with the applied first generator share command and operating the second generator in accordance with the applied second generator share command.

6. The method of claim 1 wherein the determining the common mode torsional oscillation value includes determining a common mode gain value.

7. The method of claim 1 wherein the first and second generator signals include a first generator speed signal and a second generator speed signal, and determining the common mode torsional oscillation value includes averaging the first and second generator speed signals.

8. The method of claim 1 wherein determining the differential mode torsional oscillation value includes determining a differential mode gain value.

9. The method of claim 1 wherein determining the differential mode torsional oscillation value includes calculating the difference between the first and second generator speed signals.

10. The method of claim 1 wherein the first and second generators are driven by difference kinetic sources.

11. A method of operating a set of generators supplying power to a common power bus, the method comprising:
    obtaining, in a power sharing controller module, a set of generator speed signals from the set of generators;
    determining, in the power sharing controller module, a common mode torsional oscillation value and a set of differential mode torsional oscillation values based on the obtained set of generator speed signals, wherein a number of the set of differential mode torsional oscillation values equals a number of the set of generator minus one;
    determining, in the power sharing controller module, a set of share command for the respective set of generators based on at least one of a summation of or a difference between a predetermined share ratio value for the respective generator and a subset of the differential mode torsional oscillation values;
    modifying the determined set of share commands by summating the set of share commands with the common mode torsional oscillation value; and
    applying the modified set of share commands, wherein the applying damps the differential mode torsional oscillation and the common mode torsional oscillation of the set of generators.

12. The method of claim 11, further comprising operating the set of generators in accordance with the applied set of share commands.

13. The method of claim 11 wherein determining the common mode torsional oscillation value includes averaging the obtained set of generator speed signals.

14. The method of claim 11 wherein determining the set of differential mode torsional oscillation values includes determining a first differential mode torsional oscillation value by halving the difference between a first and a second generator speed signals and a second differential mode torsional oscillation value by halving the difference between the second and a third generator speed signals.

15. The method of claim 11 wherein determining the set of share commands includes at least one summation of a predetermined share ratio value for a respective first generator and a first differential mode torsional oscillation value and at least difference between a predetermined share ratio value for a respective second generator and a second differential mode torsional oscillation value.

16. The method of claim 15 wherein determining the set of share commands further includes the summation of a predetermined share ratio value for a respective third generator with the difference between the second differential mode torsional oscillation value and the first differential mode torsional oscillation value.

17. The method of claim 11 wherein at least a subset of the generators are driven by difference kinetic sources.

18. A power distribution system, comprising:
a common power distribution bus;
a first generator having a first speed sensor and supplying power to the common power distribution bus, and a second generator having a second speed sensor and supplying power to the common power distribution bus; and
a power sharing controller module connected with the first and second speed sensors and configured to obtain a first generator speed signal from the first speed sensor and a second generator speed signal from the second speed sensor, determine a common mode torsional oscillation value and a differential mode torsional oscillation value based on the obtained first and second generator speed signals, determine a first generator share command based on the summation of a predetermined share ratio value for the first generator and the differential mode torsional oscillation value, determine a second generator share command based on the difference of a predetermined share ratio value for the second generator and the differential mode torsional oscillation value, and modify the first and second generator share commands by summating the respective share command with the common mode torsional oscillation value.

19. The power distribution system of claim 18 wherein the first and second generator are driven by difference kinetic sources.

20. The power distribution system of claim 18 wherein the first and second generator are adapted to supply power in response to receiving the respective modified first and second generator share command.

* * * * *